Aug. 11, 1925.
E. D. PUTT
1,549,727
CHUCK FOR TIRE MAKING MACHINES
Filed Dec. 26, 1919
2 Sheets-Sheet 1
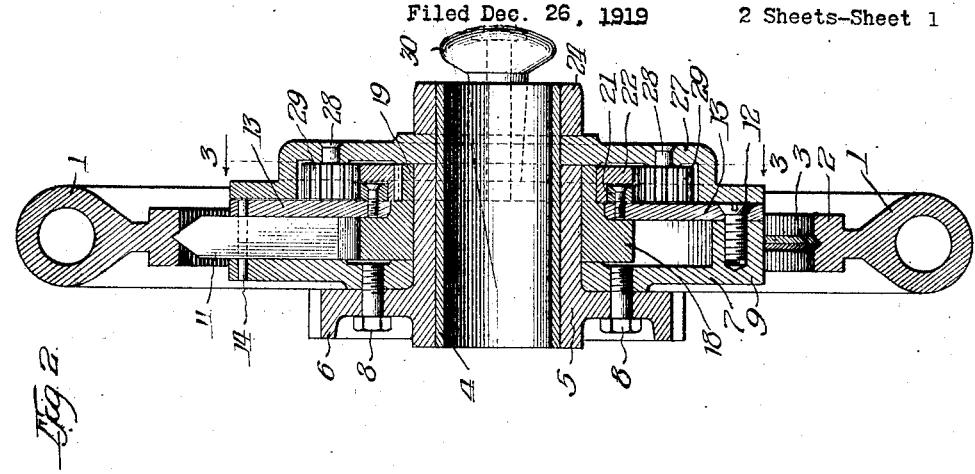
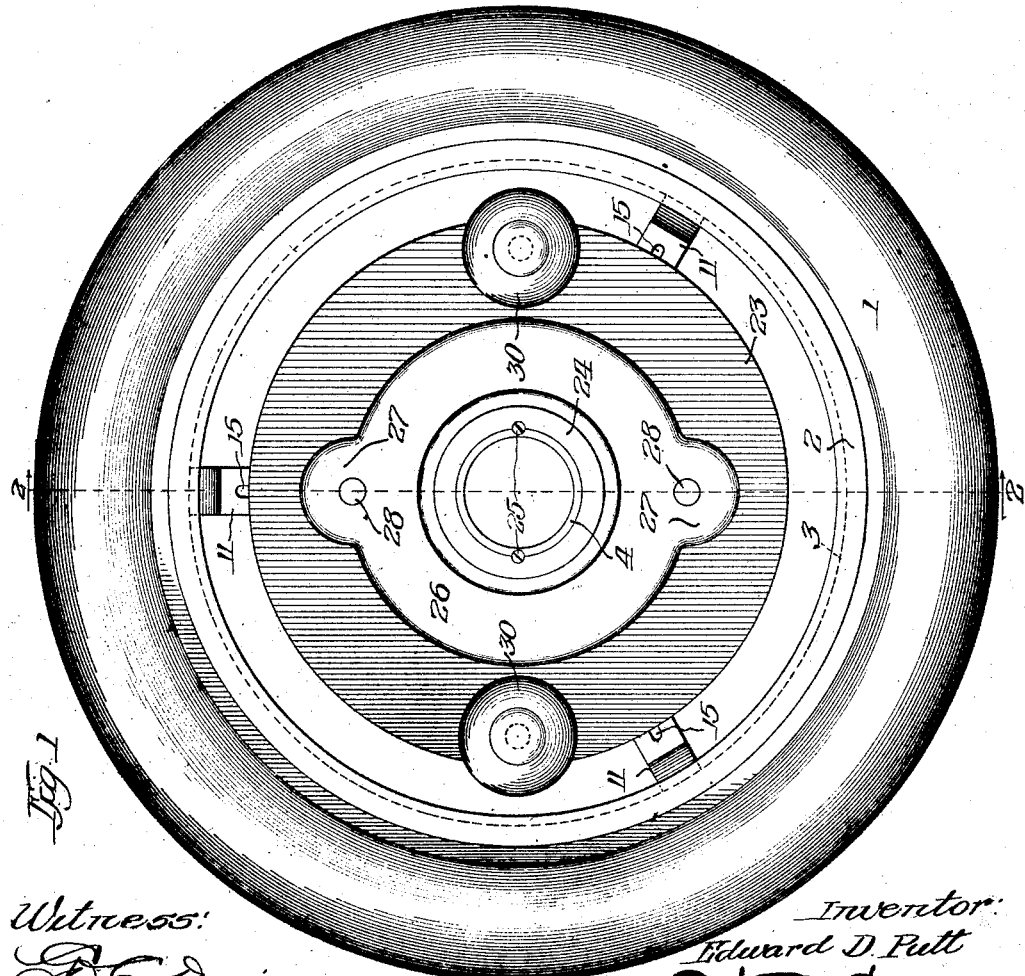
Witness:
Inventor:
Edward D. Putt Aug. 11, 1925.
E. D. PUTT
1,549,727
CHUCK FOR TIRE MAKING MACHINES
Filed Dec. 26, 1919 2 Sheets-Sheet 2
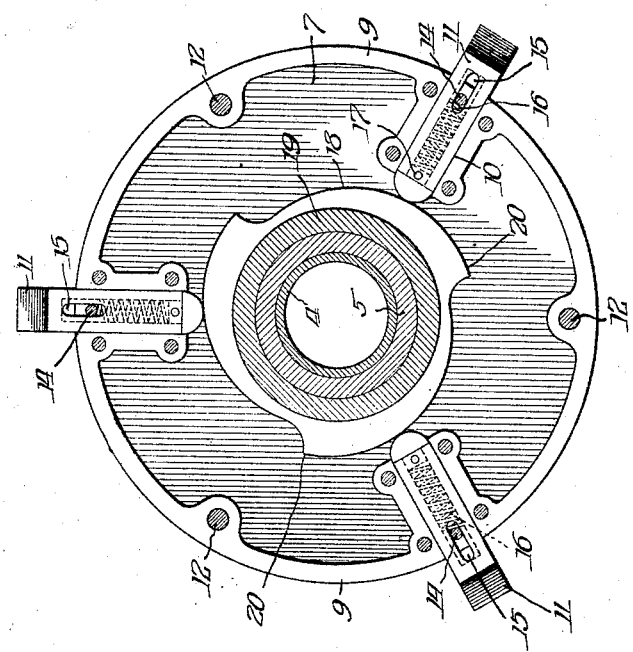
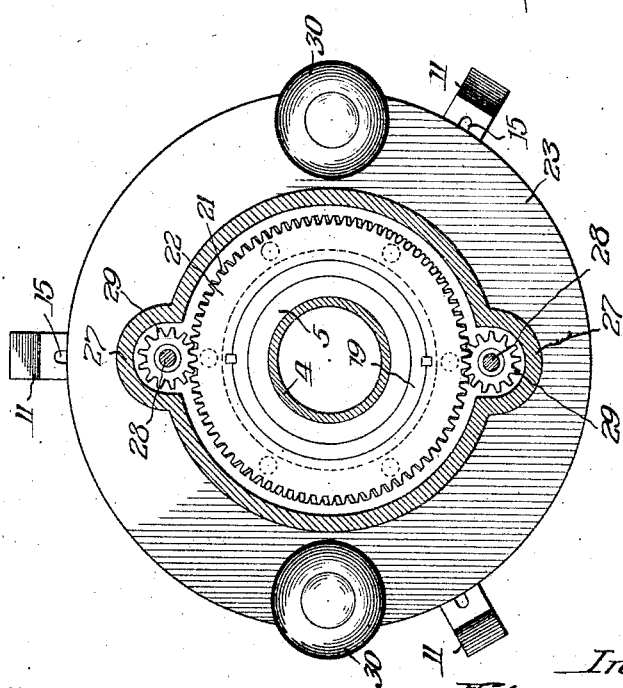
Inventor:
Edward D. Putt Patented Aug. 11, 1925.

1,549,727

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

CHUCK FOR TIRE-MAKING MACHINES.

Application filed December 26, 1919. Serial No. 347,435.

*To all whom it may concern:*

Be it known that I, EDWARD D. PUTT, a citizen of the United States, residing at Akron, in the county of Summit, State of Ohio, have invented certain new and useful Improvements in Chucks for Tire-Making Machines, of which the following is a specification.

This invention relates to a chuck for holding work which is designed to be rotated and for which it is essential that a firm securing of the work be obtained. The chuck is especially designed for holding cores in the manufacture of tires and is intended to be mounted upon and become a part of a tire making machine. For this purpose it is useful to provide a chuck which is quickly and easily operable, and also which will firmly hold the core. In the stretching of the tire fabric as performed on all tire machines, while the fabric is being wound on the core, strain is exerted on the core, which, unless firmly held, will slip introducing errors in the amount of stretch applied to the fabric.

By the form of chuck shown in this application, a mounting is provided for a tire core which is easily and quickly operated and in which the core holding means is firmly locked against retraction so that the core cannot become loosened. In previous forms of chucks the arms holding the core have not been securely locked and under strain from the fabric, will give way slightly, allowing the core to slip.

Although the invention as shown is applicable especially for use in tire machines, it may be modified for other uses, and as such is intended to be covered hereby. It is obvious that changes and modifications may be made in the form of the invention without departing from the spirit of the invention.

In the drawings:

Fig. 1 is a side elevation of the core chuck with the core mounted thereon.

Fig. 2 is a cross section of Fig. 1 on the line 2—2 of that figure.

Fig. 3 is a cross section of the chuck showing the operating pinions taken on the line 3—3 of Fig. 2.

Fig. 4 is a cross section through the core holding arms.

In the drawings a tire core of the usual construction is shown at 1, being provided with an internal tongue or extension 2 on the inner surface of which is provided a V-shaped channel 3.

The chuck body is supported on a bearing sleeve 4 to which is secured a sleeve 5 having formed thereon a gear 6 which meshes with a driving pinion on the tire machine (not shown). To the gear is secured, by bolts 8, a casing or housing 7, the outer edge of which is provided with a flange 9. In the flange 9, at preferably three points, are formed guideways 10 in which are slidably mounted arms 11 provided with tapered extremities which engage in the groove 3 on the tire core. To the outer side of the housing is secured by bolts 12 an enclosing plate 13. Between the housing and the enclosing plate, in each guideway 10 is secured a pin 14, which passes through a slot 15 in the arm 11 limiting the outward movement of the arm.

Each arm is bored interiorly, and in the bore is seated a coil spring 16, the outer end being attached to the pin 14 and the inner end bearing against the end of a pin 17. The end of this pin is rounded and forms a bearing surface.

In order to expand the arms 11 simultaneously to clamp the core in place, there is provided a centrally located cam plate 18 formed integrally with a sleeve 19 rotatably mounted on the part 5. The outer surface of the cam plate is formed with a number of cam surfaces 20 equal in number to the arms 11 against which bear the inner ends of the pins 17. It will be seen that as the cam plate 18 is rotated, the arms 11 will be simultaneously expanded or contracted.

As far as has been described, the chuck of the present invention is a counterpart of the chuck shown in Patent No. 1,256,841, dated February 19, 1918, granted to William C. Stevens, my invention having to do with an arrangement for rotating the cam plate and locking it against retraction.

Around the inner edge of the enclosing plate 13 is secured an annular gear 21 and on the outer end of the sleeve 19 is secured a second annular gear 22 which is superposed over the gear 21. The gear 21, which may be called the stationary gear, has a certain number of teeth less than the gear 22, which may be called the movable or rotary gear. In the specific embodiment of the invention, which is the preferred form, the gear 22 has two more teeth than the gear 21.

On the outer end of bearing sleeve 4 is rotatably mounted a cover plate 23 held in place by a sleeve 24 secured on the sleeve by screws 25. The cover plate is provided with a central raised portion 26 which fits over the gears and with two recesses 27. In each of these recesses is mounted a pin 28 extending toward the chuck body and carrying a rotating pinion 29 which meshes with both gears 21 and 22. On the outside of the plate are carried two handles 30 by which it may be rotated.

The operation of the device may be briefly summarized. On rotation of the cover plate 23, the pinions 29 will advance the gear 22, as will be readily understood. This action will rotate the cam plate which will advance or retract the arms 11. The arrangement of the gears 21 and 22 and the pinions 29 automatically locks the cam plate in position as it is impossible to turn the cam plate except through the operation of the cover plate. The action of the cover plate requires only a slight turning movement to move the arms 11 the distance required to move the arms 11 sufficiently to lock a core in position or release it.

While two pinions are shown and two gears with differential teeth to accommodate them, it is obvious that the number of teeth and the number of pinions is immaterial and may be changed. Mechanical equivalents may be used in place of the differential gears, which will lock the cam against backward rotation; it being my understanding that this is the first construction of core carrying chuck wherein the arm moving member is automatically locked against release except through the turning mechanism.

The description of the device has been quite detailed, but it will be understood that the details are non-essential and may be varied without sacrificing any of the benefits of the invention. The claims are intended to be broad enough to cover the full scope of the invention and are to be considered in the light of the advance made by this form of chuck over others in use.

I claim:

1. A chuck for tire cores comprising a chuck body, a plurality of radially extensible arms, a rotatable cam plate for moving the arms outwardly of the chuck body, means for actuating said cam plate, and means to hold the actuating means in position to prevent retraction of the said arms.

2. A chuck for tire cores comprising a chuck body, a plurality of radially extensible arms, means for moving all of said arms outwardly simultaneously, an actuating device for said means, and means associated with said actuating means for locking said latter means against backward movement.

3. A chuck comprising a chuck body, a plurality of radially movable arms, a central cam adapted to move the arms radially, and means to move said cam comprising a gear on said body and a gear on said cam, the gears being differential, and a common actuating pinion for said differential gear.

4. A chuck comprising a chuck body, a plurality of radially movable arms slidably mounted in said chuck body, a centrally located rotatable cam contacting the inner ends of said arms, a pair of differential gears, one of said gears being connected to the cam, the other being connected to the chuck body, and means to rotate the gears in respect to one another.

5. A chuck comprising a chuck body, a plurality of radially movable arms slidably mounted in said chuck body, a centrally located rotatable cam contacting the inner ends of said arms, a pair of differential gears, one of said gears being connected to the cam, the other being connected to the chuck body, and a pinion meshing with both of said gears.

6. A chuck comprising a chuck body, a plurality of radially movable arms slidably mounted in said chuck body, a centrally located rotatable member to expand the said arms, a pair of differential gears, one of said gears being connected to the central member the other being connected to the chuck body, and means to rotate the gears in respect to one another.

7. A chuck comprising a chuck body, a plurality of radially movable arms slidably mounted in said chuck body, a centrally located rotatable cam contacting the inner ends of said arms, a pair of differential gears, one of said gears being connected to the chuck body and the other to the cam, and a pinion meshing with both said gears.

8. A chuck comprising a chuck body, a plurality of radially movable arms slidably mounted in said chuck body, a centrally located rotatable cam contacting the inner ends of said arms, a pair of differential gears, one of said gears being connected to the chuck body and the other to the cam, a freely rotatable cover plate over the gears, and a pinion rotatably mounted on the cover plate and meshing with both said gears.

EDWARD D. PUTT.